US006964738B1

(12) United States Patent
Shen

(10) Patent No.: US 6,964,738 B1
(45) Date of Patent: Nov. 15, 2005

(54) BIOREACTOR PROCESSING OF WASTEWATER

(75) Inventor: David C. Shen, Gaithersburg, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 175 days.

(21) Appl. No.: 10/463,769

(22) Filed: Jun. 18, 2003

(51) Int. Cl.$^7$ .................................................. C02F 3/00
(52) U.S. Cl. ...................... 210/150; 210/151; 210/194; 210/197; 210/196; 210/220
(58) Field of Search ............... 210/150, 151, 210/194, 197, 196, 220

(56) References Cited

U.S. PATENT DOCUMENTS

| 5,547,579 A | 8/1996 | Brown |
| 5,569,376 A * | 10/1996 | Graves .................... 210/195.4 |
| 6,180,004 B1 | 1/2001 | Drewery |
| 6,245,239 B1 * | 6/2001 | Cote et al. .................. 210/636 |
| 6,348,154 B1 | 2/2002 | Stewart |
| 6,413,430 B1 | 7/2002 | Berger |
| 6,423,236 B1 | 7/2002 | Shiota et al. |
| 6,423,238 B2 | 7/2002 | Hernandez |
| 6,517,723 B1 * | 2/2003 | Daigger et al. ............. 210/605 |
| 2004/0108268 A1 * | 6/2004 | Liu et al. .................... 210/605 |

* cited by examiner

Primary Examiner—Chester T. Barry
(74) Attorney, Agent, or Firm—Jacob Shuster

(57) ABSTRACT

A bioreactor tank is internally partitioned into two chambers within which wastewater is respectively aerated and from which a bacteria purified permeate is withdrawn after filtration, while a high bacteria content remnant is recycled between the chambers to repeatedly undergo biological treatment by aeration within one of the tank chambers.

5 Claims, 1 Drawing Sheet

BIOREACTOR PROCESSING OF WASTEWATER

The present invention relates generally to improved bioreactor processing of wastewater.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Wastewater has heretofore been processed by biological treatment within one or more bioreactor settling tanks, induced by aeration to allow bacteria to metabolize soluble organic contaminants within the wastewater. The bacteria in the wastewater are then allowed to settle downstream and be partially recycled to maintain the concentration of bioreactive bacteria for retreatment. Membrane filtration systems for biological treatment of wastewater are also generally known.

The foregoing referred to type of prior known bioreactor and membrane filtration systems for processing wastewater, involved frequent disassembly of equipment and interruptions in operation for replacement of parts and/or cleaning of the filtration membranes because of fouling thereof. Also, relatively large tank sizes and equipment installational space was required at increased costs in order to handle wastewater processing of given quantities so as to meet certain needs such as those on-board sea vessels dependent on the availability of vessel crew handling personnel.

It is therefore an important object of the present invention to provide a membrane filtration type of bioreactor system through which tank size, membrane fouling and installational space and size are reduced, as well as associated costs while accommodating certain wastewater processing needs.

SUMMARY OF THE INVENTION

In accordance with the present invention, a single bioreactor tank is utilized for processing of wastewater delivered thereto, by aeration and settling within the tank having one large chamber and one small volume chamber separated by an internal partition. The wastewater delivered to the chamber of larger volume undergoes biological treatment by aeration and recycling by overflowing the partition into the smaller volume chamber from which wastewater of higher bacteria content is recycled back into the larger volume chamber through passageway openings in the partition.

A processed portion of the biologically treated wastewater with contaminant solids removed therefrom is separated from the wastewater within the smaller volume chamber by exposure to filtration membranes from which a maximized bacteria purified permeate is withdrawn after separation from the remaining wastewater having an increased bacterial content, which gravitationally settles toward the bottom portion of the smaller volume chamber having a downwardly converging cross-section so as to enhance by compression the recycled outflow through the partition passageway openings into the bottom of the larger volume chamber just above aeration outlets therein.

BRIEF DESCRIPTION OF DRAWINGS

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
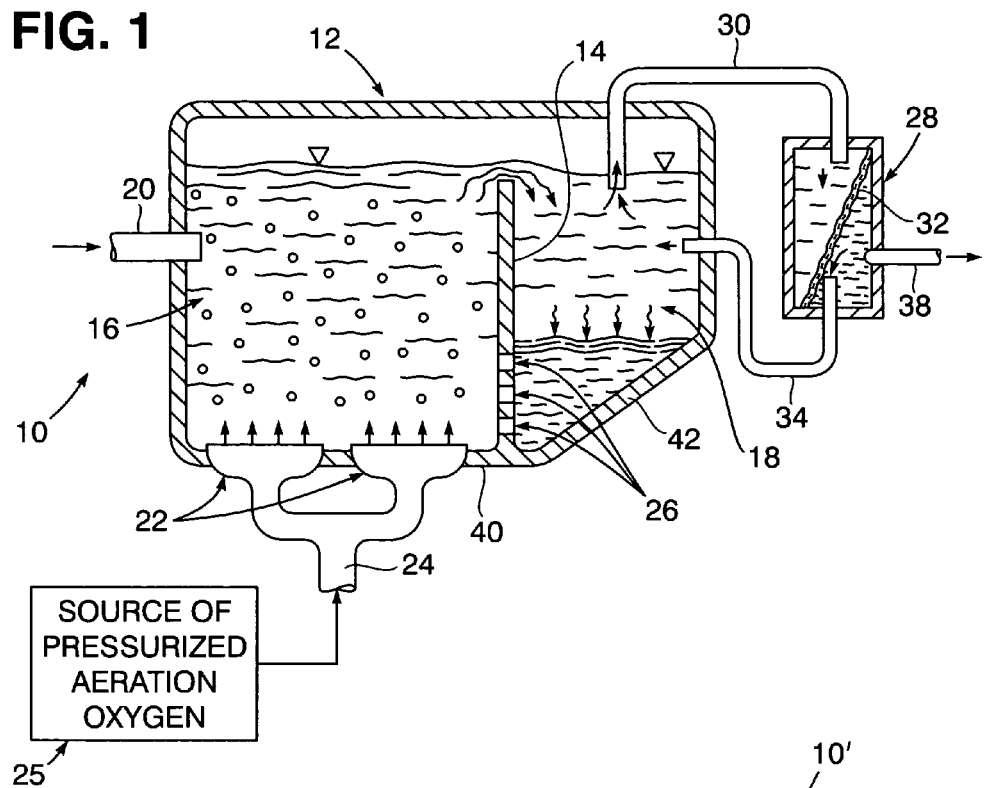
FIG. 1 is a sectional view of apparatus associated with a bioreactor processing n accordance with one embodiment of the present invention.

Referring now to the drawing in detail, the apparatus of a bioreactor processing system 10 in accordance with one embodiment of the present invention, as illustrated in FIG. 1, includes a single bioreactor tank 12 that is internally divided by one partition 14 only into one volumetrically larger chamber 16 and one volumetrically smaller chamber 18. Contaminated wastewater to be processed is delivered to one side of the tank 12 through an inflow conduit 20. Such wastewater received within the larger chamber 16 undergoes biologically reactive treatment during aeration with oxygen that is pressurized for inflow through nozzles 22 at the bottom of the tank chamber 16 connected by an aeration supply conduit 24 to some external aeration source 25.

In accordance with the present invention, wastewater within the tank 12 having its bacteria concentration increased exclusively by gravitational settlement toward the bottom of the tank chamber 18 is continuously recycled from bottom portion thereof through openings 26 in the partition 14 back into the chamber 16 adjacent to the tank bottom. The wastewater has its bacteria concentration reduced by further biological treatment by passage of the recycling wastewater at the top of the chamber 16 into a membrane filtration device 28 for filtered separation of a wastewater permeate withdrawn through a discharge conduit 38 as a fully cleansed effluent with reduced contamination of the wastewater.

As shown in FIG. 1, the membrane filtration device 28 located outside the tank 12 has a membrane filter 32 for filtered separation of the wastewater received from the top of the chamber 18 in the tank 12 through conduit 30 so that a filtered portion of the wastewater is returned from the bottom of the filtration device 28 to the side of the chamber 18 through an outflow recycling conduit 34. The discharge conduit 38 is connected to the filtration device 28 on that side of the filter 32 receiving the recycled inflow from the tank chamber 18.

As also shown in FIG. 1, the lower portion of the volumetrically smaller chamber 18 converges toward the lower end of the partition 14 at the bottom 40 of the tank 12. Such convergence is established by an inclined side wall section 42 of the tank 12 so as to enhance recycling passage of a solids concentrated portion of the recycling wastewater into the bottom portion of the volumetrically larger chamber 16 through the partition openings 26 under compression during gravitational settling within the chamber 18 before the recycling outflow through the opening 26 into the larger tank chamber 16.

Figure 2:
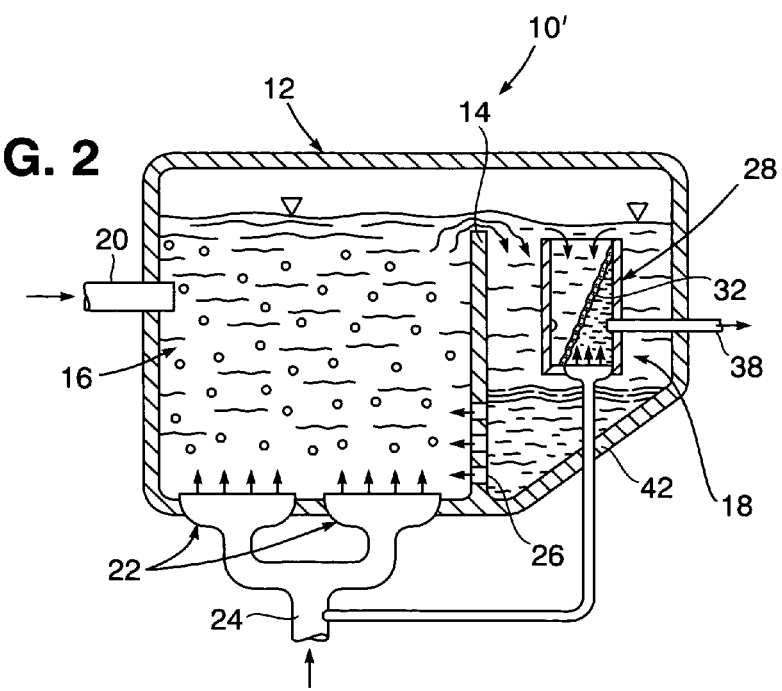
FIG. 2 is a sectional view corresponding to the processing system apparatus ed in FIG. 1, in accordance with another embodiment of the present invention.

FIG. 2 illustrates another embodiment of the present invention, wherein the membrane filtration device 28 is located inside of the chamber 18 of the tank 16 with an open top, so as to eliminate use of the conduits 30 and 34 as hereinbefore referred to in connection with the embodiment illustrated in FIG. 1. In the embodiment as shown in FIG. 2, the fully cleansed effluent is therefore withdrawn from the filtration device 28 through the discharge conduit 38 extending therefrom above the inclined side wall section 42 of the tank 12 which is fully closed at the top. Furthermore, because of the location of the filtration device 28 inside the tank chamber 18, its membrane filter 32 undergoes cleansing by scouring aeration in response to pressurized oxygen gas outflow into the bottom of the device 28 from the aeration supply conduit 24 during aeration in the tank chamber 16.

The bioreactor processing apparatus as hereinbefore described prolongs the operational life of the membrane filter 32 in the device 28 by reducing fouling thereof as a result of confinement of the filtration device 28 within recycled biologically treated wastewater having a reduced bacteria content in the small volume tank chamber 18, separated by the partition 14 from the larger volume chamber 16 so as to account for a reduced size of the tank 12 accommodating the processing of a given inflow quantity of wastewater for withdrawal of an effluent permeate with improved quality. Furthermore, because of operational and/or locational relationship of membrane separation to bioreactor treatment within the tank 12, a protective aspect is associated with the positionings of the membrane filtering device 28 either inside or outside of the tank 12 as hereinbefore described. In order to further prolong the life of the membrane 32 in the device 28, the wastewater may also be initially treated for separation of microorganisms therefrom by predeposit into the larger volume chamber 16 of fixed media such plastic balls or sheets providing large surfaces area onto which the microorganisms attach and grow.

Obviously, other modifications and variations of the present invention may be possible in light of the foregoing teachings. It is therefore to be understood that within the scope of the appended claims the invention may be practiced otherwise than as specifically described.

What is claimed is:

1. A bioreactor system for processing of wastewater within a tank by aeration and separation; the improvement residing in: partition means for internally dividing the tank into two separate chambers within which the wastewater undergoes settling; means for recycling the wastewater between the two chambers by over flow from one of the two chambers and gravitationally induced down flow into the other of the two chambers; means for respectively confining said aeration and said separation to the two separate chambers; means for extraction of an effluent of the wastewater having a reduced bacteria content from one of the two chambers in response to said separation being performed; and filtration means for performing said separation of the effluent from the wastewater within said other of the two chambers of smaller volume than that of said one of the chambers within which said aeration is performed.

2. The improvement as defined in claim 1, wherein said filtration means comprises a membrane device through which said separation is performed by permeation therethrough to effect maximized bacteria purification of the processed wastewater forming the effluent.

3. The improvement as defined in claim 2, wherein said membrane devices is located inside the smaller volume chamber.

4. A bioreactor system for processing of wastewater within a tank by aeration and separation; the improvement residing in: partition means for internally dividing the tank into two separate chambers within which the wastewater undergoes settling; means for recycling the wastewater between the two chambers; means for respectively confining said aeration and said separation to the separate chambers; means for extraction of an effluent of the wastewater having a reduced bacteria content from one of the two chambers in response to said separation; filtration means for performing said separation of the effluent from the wastewater within said one of the two chambers of smaller volume than that of the other of the chambers within which said aeration is performed; said filtration means comprising: a membrane device through which said separation is performed by permeation therethrough to effect maximized bacteria purification of the processed wastewater forming the effluent; said membrane device being located outside the tank; and scouring means connected to the aeration means for cleansing the membrane device.

5. A bioreactor system through which wastewater with contamination therein is processed, comprising: a tank internally divided into volumetrically large and small chambers; means for biologically treating the wastewater within the tank by aeration during settlement of the wastewater therein; means for continuously recycling the biologically treated wastewater between the chambers of the tank; membrane filtration means for separation of the biologically treated water within the small chamber of the tank undergoing said recycling into portions having the contamination therein respectively increased and lowered; and discharge means connected to the membrane filtration means for extraction of the separated portion of the wastewater with the lowered contamination as a cleansed effluent, said membrane filtration means being located outside the tank; and conduit means for continuous outflow of the wastewater from the small volume chamber to the membrane filtration means and return flow of the separated wastewater therefrom with increased contamination to the small volume chamber of the tank.

* * * * *